United States Patent
Hiew et al.

(10) Patent No.: US 6,342,099 B1
(45) Date of Patent: Jan. 29, 2002

(54) COATED TITANIUM DIOXIDE PIGMENTS AND PROCESSES FOR PRODUCTION AND USE

(75) Inventors: Michael Hiew, Ellicott City, MD (US); Philip Chegwidden, Australind (AU)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 09/662,940

(22) Filed: Sep. 15, 2000

Related U.S. Application Data

(60) Provisional application No. 60/201,576, filed on May 1, 2000.

(51) Int. Cl.$^7$ .............................. C09C 1/36; C08K 3/00; B32B 15/02; B32B 17/02; B32B 19/00
(52) U.S. Cl. ..................... 106/443; 106/438; 106/442; 106/450; 428/403
(58) Field of Search .......................... 106/442, 443, 106/450, 438; 428/403

(56) References Cited

U.S. PATENT DOCUMENTS

| | | | | |
|---|---|---|---|---|
| 3,767,455 A | * | 10/1973 | Claridge et al. | 117/65.2 |
| 3,804,655 A | * | 4/1974 | Hinley et al. | 106/300 |
| 3,859,115 A | * | 1/1975 | Wiseman et al. | 117/70 A |
| 4,052,223 A | * | 10/1977 | Howard | 106/300 |
| 4,328,040 A | * | 5/1982 | Panek et al. | 106/300 |
| 4,447,271 A | * | 5/1984 | Howard et al. | 106/300 |
| 5,165,995 A | * | 11/1992 | Losoi | 428/403 |
| 5,665,466 A | * | 9/1997 | Guez et al. | 106/443 |
| 5,730,795 A | * | 3/1998 | Herkimer | 106/446 |
| 5,753,025 A | * | 5/1998 | Bettler et al. | 106/442 |
| 5,785,748 A | * | 7/1998 | Banford et al. | 106/443 |
| 5,851,652 A | * | 12/1998 | Jacobson et al. | 106/443 |
| 5,942,281 A | * | 8/1999 | Guez et al. | 106/443 |
| 5,976,237 A | * | 11/1999 | Halko et al. | 106/443 |
| 6,200,375 B1 | * | 3/2001 | Guez et al. | 106/443 |

* cited by examiner

*Primary Examiner*—Mark L. Bell
*Assistant Examiner*—Patricia L. Hailey
(74) *Attorney, Agent, or Firm*—David A. Kalow, Esq.; William D. Schmidt, Esq.; Kalow & Springut LLP

(57) ABSTRACT

The present invention provides a coated titanium dioxide pigment which includes a base titanium dioxide pigment; a first deposit of a phosphate compound contiguous with the base titanium dioxide pigment; a deposit of a silica or zirconia compound contiguous with the phosphate deposit; a second deposit of a phosphate compound contiguous with the silica or zirconia compound; and a deposit of an alumina compound contiguous with the second phosphate deposit. Titanium dioxide pigments of the present invention are easily dispersible, and display excellent durability and gloss. The present invention also provides processes for preparing coated titanium dioxide pigments which include the steps of: preparing an aqueous slurry of base titanium dioxide pigment, adding a first phosphate compound to the slurry to form a first phosphate coating, adding a silica or zirconia compound to the slurry to form a silica compound coating, adding a second phosphate compound to the slurry, and adding an alumina compound coating to the slurry to form an alumina compound coating, thereby forming the coated titanium dioxide pigment.

37 Claims, No Drawings

COATED TITANIUM DIOXIDE PIGMENTS AND PROCESSES FOR PRODUCTION AND USE

This application claims the benefit of U.S. Provisional Application No. 60/201,576, filed May 1, 2000 and entitled "Titania Pigment Having Sequential Multiple Layer Hydrous Oxide Deposits Exhibiting Improved Gloss And Durability And Processes For Production And Use", the entire disclosure of which is hereby incorporated by reference into the present disclosure.

FIELD OF THE INVENTION

The invention relates to titanium dioxide pigments coated with a first layer of a phosphate compound, a layer of silica or a zirconia compound, a second layer of a phosphate compound and a layer of alumina. The titanium dioxide pigments of the present invention are easily dispersible and retain gloss and durability.

BACKGROUND

Titanium dioxides, in either rutile or anatase forms, are well known as opacifying pigments due to their high refractive index: they are among the compounds which when prepared in a size range of from about 0.2 to about 0.4 microns diffuse light as well as or better than any other known compound. However, titanium dioxide ($TiO_2$) is a semiconductor and will convert UV radiation (for example, from UV light) into low energy $\beta$-particles (electrons) which can ultimately initiate the degradation of many organic-based materials in which the pigment is used, such as paints, plastics and other organic-based compositions, through the production of various radical species.

One method to limit the effects of light on titanium dioxide pigment is to coat the pigment with inorganic compounds such as oxides and hydroxides of alumina, silica, zirconium or phosphate. Such coatings can result in a more durable product that is resistant to U.V. light induced degradation. However, some coatings cause the formation of agglomerates leading to difficulties in dispersing pigments into various organic-based compositions thereby reducing opacity and gloss.

In general, phosphate coatings are desirable to use because they exhibit good cost effectiveness. However, conventional prior art teaches that phosphate coatings greater than 0.5% tend to cause pigments to agglomerate causing reduction in dispersibility and thus opacity of the end product, as well as gloss. Accordingly, prior art phosphate coatings on titanium dioxide particles have typically been limited to phosphate contents ranging from 0.1% to 0.5% by weight based on the weight of titanium dioxide base.

Based on the foregoing, there is still a need for phosphate coated titanium dioxide pigments that are easily dispersible and exhibit excellent gloss and durability. Such coated pigments are useful in the manufacture of paints, and other coating systems.

SUMMARY OF THE INVENTION

The present invention provides titanium dioxide pigments coated with at least two layers of a phosphate compound. Preferably, a layer of silica or zirconia separates the two phosphate layers. The pigments of the present invention are easily dispersible and maintain gloss and durability comparable to the so-called "superdurable" pigments (e.g. pigments having up to 6% silica).

In one embodiment, the present invention provides a coated titanium dioxide pigment, which includes a base titanium dioxide particle; a first deposit of a phosphate compound contiguous with the base $TiO_2$ particle; a deposit of a dense silica compound contiguous with the phosphate deposit; a second deposit of a phosphate compound contiguous with the dense silica compound; and a deposit of an alumina compound contiguous with the second phosphate deposit.

In second embodiment, the present invention provides a process for preparing coated titanium dioxide pigment, comprising the steps of: a) preparing an aqueous slurry of base titanium dioxide, b) adding a first phosphate compound to the slurry to form a first phosphate compound coating, c) adding a silica compound to the slurry to form a silica compound coating, d) adding a second phosphate compound to the slurry e) adding an alumina compound to the slurry to form an alumina compound coating, thereby forming the coated titanium dioxide pigment.

In another embodiment, the present invention provides a process for preparing coated titanium dioxide pigment comprising the steps of: a) preparing an aqueous slurry of titanium dioxide base, b) adding a first phosphate compound to the slurry to form a first phosphate deposit, c) increasing the pH of the slurry to about 7.0, d) heating the slurry to a temperature of about 80° C. to about 95° C., e) adding a silica compound to the slurry over a period of about 30 minutes, f) aging the slurry for about 20 minutes, g) adjusting the pH of the slurry to about 6.5 over a period of about 60 minutes, h) adding a second phosphate compound to the slurry, i) adding an alumina compound to the slurry under conditions such that the pH of the slurry is maintained at about 6.5, j) aging the slurry for about 30 minutes, k) adjusting the pH of the slurry to about 5.3 and, l) discharging and filtering the coated titanium dioxide pigment.

In yet another embodiment, the present invention provides a process for preparing coated titanium dioxide pigment, comprising the steps of: a) preparing an aqueous slurry of titanium dioxide base, b) adding a first phosphate compound to the slurry to form a first phosphate compound coating, c) adding a silica or zirconia compound or combination thereof to the slurry to form a coating comprising silica or zirconia or combination thereof, d) adding a second phosphate compound to the slurry to form a second phosphate compound coating, e) adding an alumina compound to the slurry to form an alumina compound coating, thereby forming the coated titanium dioxide pigment.

For a better understanding of the present invention together with other and further embodiments, reference is made to the following description taken in conjunction with the examples, the scope of which is set forth in the appended claims.

DETAILED DESCRIPTION OF THE INVENTION

In preparing the preferred embodiments of the present invention, various alternatives may be used to facilitate the objectives of the invention. These embodiments are presented to aid in an understanding of the invention and are not intended to, and should not be construed to, limit the invention in any way. All alternatives, modifications and equivalents which may becomes obvious to those of ordinary skill upon a reading of the present disclosure are included within the spirit and scope of the present invention.

This disclosure is not a primer on the manufacture of titanium dioxide pigments, basic concepts known to those skilled in the art have not been set forth in detail.

Coated Titanium Dioxide Pigments

The coated titanium dioxide pigments of the present invention include base titanium dioxide particles, either rutile or anatase. Titanium dioxide base particle suitable for use in the present invention have a particle size range of less than about 1.0 microns, and more preferably from about 0.1 microns to about 0.5 microns, and most preferably from about 0.1 microns to about 0.35 microns.

The titanium dioxide base particle is coated with a first layer of a phosphate compound by depositing the phosphate compound onto the $TiO_2$ base particle. Preferably, the phosphate compound is a water soluble phosphate compound, such as for example, tetrapotassium pyrophosphate, sodium polyphosphate, tetrasodium pyrophosphate (Tetron™), sodium tripolyphosphate, potassium tripolyphosphate, sodium hexametaphosphate (Calgon™), phosphoric acid, and the like. Most preferably, the water soluble phosphate compound is sodium hexametaphosphate. The weight percent of the phosphate compound can vary depending on the layer deposited on the titanium dioxide base. It is not necessary that the phosphate compound coat each titanium dioxide particle, but only that some phosphate is deposited on the particle. Preferably, the phosphate compound in the first layer is deposited in an amount of from about 0.05% to about 1.0%, more preferably from about 0.05% to about 0.75% and most preferably, from about 0.05% to about 0.5% based upon the weight of titanium dioxide base.

The titanium dioxide particles of the present invention, optionally, are coated with a silica compound. Preferably, the silica coating is dense and contiguous with the first phosphate compound. The weight percent silica content can vary depending on the layer deposited on the first phosphate layer. Silica compounds suitable for use in the present invention include water soluble alkali metal silicates. Preferred alkali metal silicates include sodium silicate, potassium silicate, and the like. Most preferably, the silica compound is sodium silicate Preferably, the silica compound is deposited in an amount of from about 0.5% to about 5.0% by weight of silica based on the total weight of the titanium dioxide base. More preferably, from about 1% to about 5% and most preferably, the silica content is about 2.5% based on the weight of the titanium dioxide base.

In an alternate embodiment of the present invention, the titanium dioxide particles of the present invention can be coated with a zirconia compound. Preferably, the zirconia coating is contiguous with the first phosphate compound. The zirconia weight percent can vary depending on the layer deposited on the first phosphate layer. Zirconia compounds suitable for use in the present invention include the acidic salts of zirconia such as zirconium oxychloride, zirconyl sulfate, and the like. Most preferably, the zirconia compound is zirconium oxychloride or zirconyl sulfate. Preferably, the zirconia compound is deposited in an amount of from about 0.1% to about 5.0% by weight of zirconia based on the total weight of the titanium dioxide base. More preferably, from about 0.5% to about 2% and most preferably, the zirconia weight percent is from about 0.5 to about 1.0% based on the weight of the titanium dioxide base.

In another embodiment of the present invention, the titanium dioxide particles of the present invention, optionally, are coated with a combination of a silica compound and a zirconia compound as defined above. Preferably, this combination is contiguous with the first phosphate layer.

Titanium dioxide particles of the present invention are coated with a second layer of a phosphate compound. The weight percent of the second phosphate compound can vary depending on the layer deposited on the silica or zirconia layer. Preferably, the second phosphate coating is contiguous with the silica or zirconia layer. Suitable phosphate compounds for use in the present invention include water soluble phosphate compounds, such as for example, tetrapotassium pyrophosphate, sodium polyphosphate, tetrasodium pyrophosphate (Tetron™), sodium tripolyphosphate, potassium tripolyphosphate, sodium hexametaphosphate (Calgon™), phosphoric acid, and the like. Most preferably, the water soluble phosphate compound is sodium hexametaphosphate.

It will be understood by those skilled in the art that the phosphate compound used in the first layer can be the same or a different phosphate compound as that used in the second phosphate layer. Preferably, the phosphate compound in the second phosphate layer is deposited in an amount of from about 0.05% to about 1.0%, more preferably from about 0.08% to about 0.75% and most preferably, from about 0.05% to about 0.5% based upon the weight of titanium dioxide base.

The total phosphate content of the pigments of the present invention including both phosphate layers is preferably, not less than about 0.1% and not greater than about 2% of the total weight of the titanium base. Phosphate content of greater than about 2% based on the total weight of the titanium dioxide base tends to cause agglomerate formation reducing dispersibility of the pigment, the opacity of the coating system and ultimate gloss.

Following the deposition of the second phosphate compound, the titanium dioxide particle is coated with an alumina compound. Preferably, the alumina compound is contiguous with the second phosphate layer. Suitable alumina compounds for use in the present invention include aluminates, such as for example, sodium or potassium aluminate, aluminum sulfate, aluminum chloride, and the like. Most preferably, the water soluble alumina compound is sodium aluminate. The weight percent of the alumina compound can vary depending on the alumina layer deposited on the second phosphate layer. The alumina compound comprises preferably from about 1.0% to about 5.0% by weight and more preferably, from about 2.0% to about 3.0% by weight, and most preferably, about 2.0% by weight of the alumina compound based on the total weight of the titanium dioxide base.

In the most preferred embodiment of the present invention, it has been found unexpectedly that by splitting the phosphate addition into at least two separate deposits, with an intermediate silica layer of about 2.5% (based upon the weight of $TiO_2$ pigment), and a final deposit of alumina in the range of about 1% to about 3% (based upon the weight of the titanium dioxide pigment), that a level of pigment durability approaching or surpassing that of some of the superdurable grade pigments is achieved. It is known in the art that some superdurable pigments incorporate up to six weight percent of dense silica and alumina in the pigment to enhance durability. Unlike these superdurable pigments, the pigments of the present invention can have less silica content, maintain equal or improved durability, while exhibiting improved gloss and dispersibility.

Preparing Coated Titanium Dioxide Pigments

The coated titanium dioxide pigments of the present invention can be prepared starting with titanium dioxide base particles. Titanium dioxide base particles are produced commercially in two crystalline forms, namely the rutile form which is usually produced by the chloride and sulfate processes and the anatase form which is usually produced by the sulfate process. Both of these well known processes are generally described in U.S. Pat. No. RE 27,818 and U.S. Pat. No. 2,559,638 and those basic descriptions are incorporated herein by reference. The present invention is applicable to both the rutile and anatase forms of $TiO_2$ pigment.

Generally, the $TiO_2$ base particles are subjected to wet milling or grinding by methods known in the art to provide a base of substantially uniform particle size. Preferably, the base particle has a size range of less than about 1.0 microns, and more preferably, between about 0.1 microns and about 0.5 microns, and most preferably between about 0.1 microns and about 0.35 microns.

Coated pigments of the present invention are prepared by the formation of an initial aqueous slurry of the base titanium oxide. Slurries of titanium dioxide base can be made by methods known in the art. Preferably, the slurry has a $TiO_2$ solids content of greater than about 5%, more preferably, less than about 75% and most preferably, the $TiO_2$ slurry has a $TiO_2$ solids content of about 30%.

Optionally, a water soluble dispersing agent can be added to the slurry to maintain the pigment in a highly dispersed state. Suitable dispersing agents are well known in the art.

Typically, the pH of the initial slurry can be determined by those skilled in the art and adjusted to a desired pH range using methods known in the art. For example, if adjustment of the pH of the slurry becomes necessary, such adjustments can be made by simply adding a suitable acid or suitable base. Suitable acids include water soluble acids such as hydrochloric acid, sulfuric acid, phosphoric acid, nitric acid, and the like. Preferably, the pH of the initial slurry is at least about 3.5. Suitable bases include water soluble alkaline bases such as ammonia, sodium hydroxide or other suitable alkaline compounds.

The temperature of the slurry can be maintained at a range that will facilitate the deposition of the phosphate, silica or zirconium and the alumina layers on the titanium dioxide base. Preferably, the slurry is heated to a temperature range from about 30° C. to about 100° C. depending on the specific deposition step. The temperature of the slurry can be adjusted or maintained throughout the process through the use of conventional heating means known by those skilled in the art, such as for example, steam.

In the most preferred embodiment of the present invention, the titanium dioxide is surface treated with the first and second phosphate compounds, the silica or zirconia compound and the alumina compound. One particularly preferred surface treatment is wet-treatment. Methods of wet-treatment are well known to those skilled in the art.

First Phosphate Addition

Following the formation of the initial slurry, a phosphate compound is added to the slurry while the temperature of the slurry is preferably lower than about 35° C. For purposes of the present invention, any water soluble phosphate compound capable of providing phosphate for deposition upon the titanium dioxide base under the operating conditions of the process can be employed. Suitable phosphate compounds for use in the present invention include water soluble phosphate compounds, such as for example, tetrapotassium pyrophosphate, sodium polyphosphate, tetrasodium pyrophosphate, sodium tripolyphosphate, potassium tripolyphosphate, sodium hexametaphosphate, phosphoric acid, and the like. Most preferably, the water soluble phosphate compound is sodium hexametaphosphate.

The weight percent of the phosphate compound can vary depending on the layer of phosphate produced. It is not necessary that the phosphate compound coat each titanium dioxide particle, but only that some phosphate is deposited on the particle. Preferably, the phosphate coating is continuous rather than discontinuous. In one embodiment of the present invention, the phosphate compound is added to the slurry in an amount of preferably from about 0.05% to about 0.5%, more preferably from about 0.1% to about 0.3% and most preferably from about 0.1% to about 0.2% based upon the total weight of titanium dioxide pigment.

Typically, the phosphate compound is added to the slurry under agitation, such as for example by an in-line mixer or other suitable means, over a period of preferably from about 5 minutes to 120 minutes. More preferably, the phosphate compound is added to the slurry over a period from about 10 minutes to about 60 minutes and most preferably from about 10 minutes to 20 minutes.

The pH of the slurry is adjusted before, during or after the addition of the phosphate compound. The specific pH can be determined by those skilled in the art and adjusted to a desired pH range used by methods known in the art. For example, if adjustment of the pH of the slurry becomes necessary, such adjustments can be made by adding a suitable acid or suitable base as discussed above. Preferably, the pH is adjusted to above about 6.0, more preferably to a range of from about 6.0 to about 7.0, and most preferably the pH is adjusted to the range of from about 6.5 to about 7.0.

Silica or Zirconia Additions

Following deposition of the first phosphate compound on the base titanium dioxide, optionally, a silica compound is added to the slurry. Preferably, the temperature of the slurry is raised to above about 70° C., more preferably from about 70° C. to about 100° C., and most preferably, from about 86° C. to about 95° C. For purposes of the present invention, any water soluble silica compound capable of providing silica for deposition upon the titanium dioxide particle under the operating conditions of the process of the present invention can be employed. Silica compounds suitable for use in the present invention include water soluble alkali metal silicates. Preferred water soluble alkali metal silicates include sodium silicate, potassium silicate, and the like. Most preferably, the silica compound is sodium silicate.

The weight percent of the silica compound can vary depending on the layer of dense silica produced. Preferably, the silica coating is dense, and continuous rather than porous and discontinuous. As used herein, aging or curing refers to maintaining the slurry under conditions so that the slurry reaches physical and chemical equilibrium. The time for aging the silica is preferably, at least about 5 minutes, more preferably from about 5 minutes to about 120 minutes and most preferably, from about 5 to about 10 minutes. Preferably, the silica compound is deposited in an amount from about 0.5% to about 5.0% by weight of silica, more preferably from about 1% to about 5% and most preferably, the silica content is about 2.5% based on the total weight of the titanium dioxide base.

Preferably, the silica compound is added to the slurry under agitation, such as for example by an in-line mixer or other suitable means, over a period of at least about 5 minutes to 120 minutes, more preferably, from about 10 minutes to about 60 minutes and most preferably, from about 20 minutes to about 30 minutes depending on the process selected (i.e., continuous or batch).

As with the first phosphate layer, the pH of the slurry can be adjusted during or after the addition of the silica compound in order to produce a dense, coating of silica compound on the titanium dioxide particle. The specific pH can be determined by those skilled in the art and adjusted to a desired pH range used by methods known in the art. For example, if adjustment of the pH of the slurry becomes necessary, such adjustments can be made by adding a suitable acid or suitable base as discussed above. Most preferably, the pH is adjusted to the range from about 5.0 to about 8.0 over a period from about 20 minutes to about 60 minutes after the silica compound is added depending on the process selected.

Optionally, instead of a silica compound, following deposition of the phosphate compound on the base titanium dioxide, a zirconia compound can be added to the slurry. Preferably, the temperature of the slurry is about room temperature, 15–25° C., or greater when the zirconia compound is added. For purposes of the present invention, any water soluble zirconia compound capable of providing zirconia for deposition upon the titanium dioxide particle under the operating conditions of the process of the present invention can be employed. Zirconia compounds suitable for use in the present invention include acidic salts such as zirconium oxychloride, zirconyl sulfate, and the like. Most preferably, the zirconia compound is zirconium oxychloride or zirconyl sulfate.

The weight percent of the zirconia compound can vary depending on the layer produced. Preferably, the zirconia coating is continuous rather than discontinuous. The time for aging the zirconia is preferably, at least about 5 minutes, more preferably from about 5 minutes to about 120 minutes and most preferably, from about 5 to about 10 minutes. Preferably, the zirconia compound is deposited in an amount of from about 0.1% to about 5.0% by weight of zirconia based on the total weight of the titanium dioxide base. More preferably, from about 0.5% to about 2% and most preferably, the zirconia weight percent is about 0.5–1.0% based on the weight of the titanium dioxide base.

Preferably, the zirconia compound is added to the slurry under agitation, such as for example by an in-line mixer or other suitable means, over a period of at least about 5 minutes to 120 minutes, more preferably, from about 10 minutes to about 60 minutes and most preferably, from about 20 minutes to about 30 minutes depending on the process selected (i.e., continuous or batch).

As with the first phosphate layer, the pH of the slurry can be adjusted, during or after the addition of the zirconia compound in order to produce a coating on the titanium dioxide particle. The specific pH can be determined by those skilled in the art and adjusted to a desired pH range used by methods known in the art. For example, if adjustment of the pH of the slurry becomes necessary, such adjustments can be made by adding a suitable acid or suitable base as discussed above. Most preferably, the pH is adjusted to the range from about 3.0 to about 8.0 over a period from about 20 minutes to about 60 minutes after the silica compound is added depending on the process selected (i.e. continuous or bath).

Optionally, following the deposition of the first phosphate compound on the titanium dioxide base, a combination of silica or zirconia can be added to the slurry. Suitable silica and zirconia compounds are described above.

The present invention also contemplates splitting the phosphate addition into at least two separate deposits on titanium dioxide, with an intermediate non-phosphate hydrous oxide layer between the phosphate deposits. Intermediate non-phosphate compounds suitable for use in the present invention include silica or zirconia, and the like.

Second Phosphate Addition

Following the deposition of the silica or zirconia compound on the titanium dioxide particle, a second phosphate compound is added to the slurry while the temperature of the slurry is maintained at greater than about 30° C. For purposes of the present invention, any water soluble phosphate compound capable of providing phosphate for deposition upon the titanium dioxide pigment under the operating conditions of the process can be employed. Such phosphate compounds can be the same or different phosphate compounds as used in the first phosphate layers. Suitable phosphate compounds for use in the present invention include water soluble phosphate compounds, such as for example, tetrapotassium pyrophosphate, sodium polyphosphate, tetrasodium pyrophosphate, sodium tripolyphosphate, potassium tripolyphosphate, sodium hexametaphosphate, phosphoric acid, and the like. Most preferably, the water soluble phosphate compound is sodium hexametaphosphate.

The weight percent concentration of the phosphate compound can vary depending on the layer of phosphate produced. Preferably, the phosphate coating is continuous with the silica deposition, rather than discontinuous. The phosphate compound is added to the slurry in an amount of preferably from about 0.05% to about 0.5%, more preferably from about 0.1% to about 0.3% and most preferably from about 0.1% to about 0.2% based upon the total weight of titanium dioxide base.

As with the first phosphate addition, the second phosphate compound in this layer is added to the slurry under agitation, such as for example by an in-line mixer or other suitable means, over a period of preferably from about 5 minutes to 120 minutes, more preferably from about 10 minutes to about 60 minutes and most preferably, over about 10 minutes to about 20 minutes.

The temperature of the slurry can be maintained at a range that will facilitate the deposition of the second phosphate compound on the titanium dioxide pigment. Preferably, the slurry is maintained at a temperature range of from about 30° C. to about 100° C.

Alumina Addition

Following the addition of the second phosphate compound to the slurry, an alumina compound is added to the slurry while the slurry is maintained at a temperature of above preferably 50° C. Suitable alumina compounds for use in the present invention include, water soluble alkali metal aluminates, such as for example, sodium or potassium aluminate, or acidic salts such as aluminum sulfate or aluminum chloride. Most preferably, the water soluble alumina compound is sodium aluminate.

The weight percent of the alumina compound can vary depending on the alumina layer deposited with the phosphate layer. The alumina compound comprises, preferably from about 1.0% to about 5.0% and more preferably from about 2.0% to about 3.0%, and most preferably about 2.0% by weight based on the total weight of the titanium dioxide pigment.

As with other additions, preferably, the alumina compound is added to the slurry under agitation, over a period of preferably from about 5 minutes to 120 minutes, more preferably from about 10 minutes to about 60 minutes and most preferably over about 10 minutes to about 20 minutes depending on the process selected (i.e., continuous or batch).

The pH of the slurry is adjusted during the addition of the alumina compound in order to deposit the alumina compound on the titanium dioxide base. The specific pH can be determined by those skilled in the art and adjusted to a desired pH range used by methods known in the art. For example, such adjustments can be made by simply adding a suitable acid or suitable base as discussed above. Preferably the pH is adjusted to the range from about 7.8 to about 4.0, more preferably from about 7.0 to about 5.0, and most preferably from about 6.5 to about 5.3.

The temperature of the slurry can be maintained at a range that will facilitate the deposition of the alumina compound on the titanium dioxide pigment. Preferably, the slurry is heated to a temperature range of from about 30° C. to about 100° C.

Upon completion of the addition of the alumina compound, the pH of the slurry is adjusted to preferably about 4.0 to 8.0. The resultant titanium dioxide pigment coated with a first phosphate layer, a silica or zirconia layer, a second phosphate layer and, an alumina layer is recovered by filtration, washed substantially free of soluble salts adhering to the pigment, dried and then subjected to final milling using fluid energy milling techniques known in the art. Preferably, the washed and dried pigment is micronized in a steam micronizer at intensities known by those skilled in the art.

Optionally, a polyol such as for example, trimethylolpropane (TMP), trimethylolethane (TME) or pentaerythritol, and the like, can be added to the pigment during steam micronization. In the most preferred embodiment, TMP is added in an amount of from about 0.2% to 0.4% based on the weight of the titanium dioxide pigment.

Continuous and Batch Processes

It will be understood by those skilled in the art that the process of the present invention can be performed by a batch process or continuous process and combinations thereof. Preferably, continuous processes involve continuous feed pipelines with cascading treatment tanks with separate addition points for phosphate, silica and alumina compounds, pH adjusters and other additives. Continuous processes typically involve residence times of less than about 120 minutes, preferably from about 5 minutes to about 120 minutes, more preferably from about 10 minutes to 60 minutes, and most preferably from about 10 minutes to about 30 minutes for individual phosphate, silica, zircona and alumina deposition on the titanium dioxide pigment.

Batch processes generally involve longer pigment processing times with one addition point for phosphate, silica and alumina compounds, pH adjusters and other additives. Typically, batch processes involve residence times of generally greater than about 10 minutes for phosphate, silica, zircona and alumina deposition on the titanium dioxide particle. Regardless of the process used (batch or continuous), the coated pigments of the present invention are suitable for use in paints, plastics, and coatings, where both durability and gloss are needed.

Dispersibility, Gloss and Durability

It has unexpectedly been discovered that the coated pigments produced by the methods of the present invention have good, dispersibility, gloss or durability. Dispersibility is determined by methods known in the art. For example, the coated titanium dioxide pigments of the present invention can be mixed in a plastic or paint and the distribution of the pigment particles measured. Uniform distribution of the pigment throughout the paint or plastic indicates good dispersibility, while agglomerate formation would indicate poor dispersibility of the pigment. Some methods of determining dispersibility known in the art include tinting strength, Q test, and the like.

Gloss is determined by methods known in the art. Preferably, the gloss is determined by incorporating the pigment into paint and measuring the gloss using a gloss meter. In the most preferred method, the pigments made by the methods of the present invention are incorporated into acrylic based paints at 40% PVC (pigment volume concentration) and the 20° gloss measured.

Durability of the pigments of the present invention can be determined by methods known in the art. Some methods of measuring durability include measuring photocatalytic activity of the pigment, acid solubility of the titanium dioxide base, natural exposure and weatherometer testing. Most preferably, durability is measured by natural exposure or weatherometer testing.

Weatherometer testing involves incorporating the pigments into, for example, paint and subjecting the paint to exposure in an Atlas Weatherometer and then comparing the coated pigments with two phosphate layers against coated pigments produced with one or no phosphate layers. The pigments are then rated as to durability.

Having now generally described the invention, the same may be more readily understood through the following reference to the following examples, which are provided by way of illustration and are not intended to limit the present invention unless specified.

EXAMPLES

The following examples are presented to aid in an understanding of the present invention and are not intended to, and should not be construed to, limit the invention in any way. All alternatives, modifications and equivalents which may becomes obvious to those of ordinary skill in the art upon a reading of the present disclosure are included within the spirit and scope of the invention.

Example 1

To a vigorously stirred aqueous slurry of a rutile $TiO_2$ base, having a mean diameter of about 0.15 microns to about 0.35 microns, was added a 0.2% $P_2O_5$ (phosphate) as Calgon-™ (sodium hexametaphosphate) aqueous solution by weight of $TiO_2$ base. The slurry was heated to between about 85° C. and 90° C. and the pH of the slurry then increased to about 7.0 using a sodium hydroxide solution. A sodium silicate solution, (2.5% by weight $SiO_2$ based on weight of $TiO_2$ base,) was added to the titania pigment particles with the addition being made over about a twenty minute period. Subsequently, the slurry was aged (or cured) for a period of about 5 to 10 minutes. The pH was readjusted to about 6.5 using HCl over approximately 60 minutes and followed by a second addition of a 0.2% $P_2O_5$ (phosphate) as Calgon-™ (sodium hexametaphosphate).

Next, 2% by weight of alumina was added to the slurry as a sodium aluminate solution while maintaining the pH at about 6.5 using HCl over about a 20-minute period. This addition was followed by an aging or curing period of approximately 10 minutes, where the pH was adjusted to about 5.3 with HCl. The pH was rechecked periodically and readjusted as necessary. After pH stabilization the pigment was discharged to a filter and washed. The filter cake was washed and dried and micronized in a steam micronizer with the addition of from about 0.2% to 0.4% Trimethylolpropane (TMP).

Example 2

Example 2 is a Comparative Example based on Example 1 except that the entire quantity of phosphate was added in only one treatment step.

Example 3

Example 3 repeats the treatment of Example 1, however the base pigment was sulfate-based rutile $TiO_2$. The dried product was micronized at two different intensities using either a steam to pigment ratio of 2.0 or 2.5.

Example 4

Example 2 was repeated, but the base pigment was rutile titanium dioxide from a sulfate process.

Pigment Durability and Retention Test Methods

Pigments were made into a 15% PVC (pigment volume concentration) air-dried acrylic paint using Synocryl-9122X™ resin. These paints were subsequently drawn down onto aluminum test panels and left to dry for 24 hours before a second coating of ca 100 um. was applied. The panels were dried until there was no tack apparent.

Initial baseline gloss was read with a Glossgard II-TM glossmeter to establish baseline values. The panels were subsequently exposed in an Atlas Ci65A Weatherometer. The panels are then checked for gloss and chalking at approximately 300 hour intervals. Gloss was measured as gloss units with the glossmeter calibrated by a calibrated gloss tile (Sheen Instruments Inc, UK.).

Chalk was determined by comparing the intensity of the whiteness of pigment particles adhering to a strip of adhesive tape which adhered to and subsequently removed from a test paint panel under conditions of constant pressure and compared against a set of standards (available from Paint Research Institute, TNO). The chalk rating was scaled to between 0 and 10 with the higher number indicating higher quantity of loose pigment particles, or more advanced chalking, and thus more paint deterioration.

20-degree 40% PVC Acrylic Gloss Test Method

Pigment was incorporated into a 40% PVC (pigment volume concentration) Acrylic paint using a Synocryl 9122X resin. The prepared paint was drawn down on glass panels using an automatic draw down device incorporating a 100-micron doctor blade. The paint panel was allowed to dry in a dust free cabinet for a minimum of 5 hours before reading the 20-degree gloss values from a Glossgard II glossmeter. Typically, up to 5 measurements were recorded from each panel and the average result tallied.

Table I illustrates the gloss in Air Dried Acrylic Systems using the exemplified pigments.

TABLE I 20-degree Gloss Test for 40% PVC in an Acrylic Paint System

| Example | 1st. set | 2<sup>nd</sup> set | 3<sup>rd</sup> set |
|---|---|---|---|
| 1 | 48 | 50 | 49 |
| 2 | 45 | 45 | 45 |

The results illustrate the consistent repeatability of the tests. Moreover, Table I illustrates the gain in the 20 Degree Gloss using a split phosphate treatment (Example 1) in the 40% Pigment Volume Concentration (PVC) acrylic paint system test versus the single phosphate addition (Example 2).

TABLE II 20-degree Gloss for a 40% PVC in an Acrylic Paint System

| Example | Micronization Intensity | |
|---|---|---|
| | Low Intensity | High Intensity |
| 3 | 55 | 61 |
| 4 | 51 | 55 |

Table II illustrates the consistent improvement by up to ten percent of the 40% PVC acrylic gloss with the split phosphate treatment (Example 3) versus single phosphate addition (Example 4) in sulfate-based pigments. The results show a ten percent improvement in gloss that is difficult to achieve in superdurable pigments (which incorporate up to 6% by weight of dense silica) having this level of gloss.

Comparative Durability Testing

The pigments produced according to Examples 1 and 2 were subjected to durability testing in an air-dried acrylic paint systems together with a superdurable pigment containing from four to six percent by weight of silica.

The gloss values referred to in Tables III and Tables IV were measured at 20 degrees from perpendicular to the sample surface. Total gloss and total chalk values refer to the sums of all the individual gloss and chalk measurement values respectively, recorded at regular exposure intervals of around 300 hours.

TABLE III

First Series after 6994 Hours Exposure in an Atlas Weatherometer

| Pigment | Surface Treatment | Total Gloss | Total Gloss/ Initial Gloss | Total Chalk |
|---|---|---|---|---|
| Ex. 1. | 2.5% SiO$_2$ | 642 | 10.0 | 9 |
| Ex. 2. | 2.5% SiO$_2$ | 581 | 9.5 | 12 |
| Com. Ex 1. | 4.5% SiO$_2$ | 538 | 9.0 | 9 |
| Com. Ex. 2. | 3.0% SiO$_2$ | 471 | 7.5 | 14 |
| Com Ex. 3. | 3.0% SiO$_2$ | 520 | 8.0 | 15 |

TABLE IV

8519-Hour Atlas Weatherometer Exposure

| Pigment | Treatment | Total Gloss | Tot. Gloss/ Init. Gloss | Total chalk |
|---|---|---|---|---|
| Ex.1 | 2.5% SiO2 | 550 | 9.1 | 12 |
| Ex.2 | 2.5% SiO2 | 498 | 8.3 | 12 |
| Ex.3 | 4.5% SiO2 | 438 | 7.7 | 12 |
| Ex. 5 | 8.0% SiO2 | 406 | 8.1 | 12 |
| Ex. 6 | 5.0% SiO2 | 435 | 7.3 | 12 |
| Com.Ex.1 | 3.0% SiO2 | 405 | 6.1 | 16 |
| Com.Ex.2 | 3.0% SiO2 | 499 | 8.3 | 12 |

Table III illustrates that the split phosphate treated samples (Example 1) performed consistently better than single stage phosphate addition (Example 2) and the competitive products in gloss retention (Com. Ex. 1, Com. Ex. 2 and/or Com. Ex. 3). The chalking resistance of the split phosphate treated pigments is equal to or better than both the single stage phosphate treated sample and the three competitive products.

Table IV illustrates the Gloss and Chalk values for various competitive samples using differing levels of silica coatings as compared to the embodiments of the present invention. Table IV shows that the gloss and chalk values of the coated pigments of the present invention are at least comparable to, if not better than, the superdurable pigments.

Having thus described and exemplified the invention with a certain degree of particularity, it should be appreciated that the following claims are not to be so limited but are to be afforded a scope commensurate with the wording of each element of the claim and equivalents thereof.

What is claimed:

1. A coated titanium dioxide pigment, comprising: a base titanium dioxide particle; a first deposit of a phosphate compound contiguous with the base titanium dioxide particle; a deposit of a dense silica compound contiguous with the phosphate deposit; a second deposit of a phosphate compound contiguous with the dense silica compound; and a deposit of an alumina compound contiguous with the second phosphate deposit.

2. A coated titanium dioxide pigment according to claim 1, wherein the silica compound comprises an amount of from about 1.0 to about 5.0 percent based on the weight of the coated pigment.

3. A coated titanium dioxide pigment according to claim 1, wherein the base titanium dioxide particle comprises a diameter of greater than about 0.1 microns to about 1.0 microns.

4. A coated titanium dioxide pigment according to claim 1, wherein the base titanium dioxide particle comprises a mean diameter of from about 0.1 to about 0.35 microns.

5. A coated titanium dioxide pigment according to claim 1, wherein the base titanium dioxide particle is anatase or rutile.

6. A coated titanium dioxide pigment according to claim 1, wherein the phosphate compound is sodium hexametaphosphate.

7. A coated titanium dioxide pigment according to claim 1, wherein the silica compound is sodium silicate.

8. A coated titanium dioxide pigment according to claim 1, wherein the alumina compound is sodium aluminate.

9. A coated titanium dioxide pigment according to claim 1, wherein the coated titanium dioxide pigment further comprises trimethylolpropane.

10. A coated pigment titanium dioxide pigment according to claim 1, wherein the first phosphate deposit comprises an amount of from about 0.05 to about 0.5 percent based on the weight of the coated titanium dioxide pigment.

11. A coated titanium dioxide pigment according to claim 1, wherein the second phosphate deposit comprises an amount of from about 0.05 to about 1.0 percent based on the weight of the coated titanium dioxide pigment.

12. A coated titanium dioxide pigment according to claim 1, wherein the first and second phosphate deposits have a total phosphate content of less than about 2 percent based on the total weight of the coated titanium pigment.

13. A coated titanium dioxide pigment according to claim 1, wherein the first and second phosphate deposits have a total phosphate content of about 0.5% based on the total weight of the coated titanium pigment.

14. A coated titanium dioxide pigment according to claim 1, wherein the coated titanium dioxide pigment is produced by a continuous or batch process and combinations thereof.

15. A process for preparing coated titanium dioxide pigment, comprising the steps of:
  a) preparing an aqueous slurry of base titanium dioxide,
  b) adding a first phosphate compound to the slurry to form a first phosphate compound coating,
  c) adding a silica compound to the slurry to form a silica compound coating,
  d) adding a second phosphate compound to the slurry,
  e) adding an alumina compound to the slurry to form an alumina compound coating, thereby forming the coated titanium dioxide pigment.

16. A process for preparing the coated titanium dioxide pigment according to claim 15, wherein the process further comprises step f) recovering the coated titanium dioxide pigment.

17. A process for preparing the coated titanium dioxide pigment according to claim 15, wherein step b) further comprises heating the slurry to a temperature greater than about 30° C. and adjusting the pH of the slurry to about 7.0 after adding the first phosphate compound.

18. A process for preparing the coated titanium dioxide pigment according to claim 15, wherein step c) further comprises adding the silica compound to the slurry over a period of about 30 minutes and adjusting the pH of the slurry to about 6.5 over a period of about 60 minutes.

19. A process for preparing the coated titanium dioxide pigment according to claim 15, wherein step e) further comprises adding the alumina compound coating to the slurry while maintaining the pH at about 6.5, aging the slurry for about 30 minutes to form the alumina compound coating.

20. A process for preparing the coated titanium dioxide pigment according to claim 15, wherein the first phosphate compound comprises an amount of from about 0.05 to about 0.5 percent based on the total weight of the coated titanium dioxide pigment.

21. A process for preparing the coated titanium dioxide pigment according to claim 15, wherein the second phosphate compound comprises an a mount of from about 0.05 to about 1.0 percent based on the weight of the coated titanium dioxide pigment.

22. A process for preparing the coated titanium dioxide pigment according to claim 15, wherein the first and second phosphate compounds have a total phosphate content of less than about 2% based on the total weight of the coated titanium pigment.

23. A process for preparing the coated titanium dioxide pigment according to claim 15, wherein the first and second phosphate compounds have a total phosphate content of about 1% based on the total weight of the coated titanium pigment.

24. A process for preparing the coated titanium dioxide pigment according to claim 15, wherein the titanium dioxide base pigment is rutile or anatase.

25. A process for preparing the coated titanium dioxide pigment according to claim 15, wherein the base titanium dioxide pigment has a mean diameter of from about 0.01 to about 1.0 microns.

26. A process for preparing the coated titanium dioxide pigment according to claim 15, wherein the silica compound is sodium silicate.

27. A process for preparing the coated titanium dioxide pigment according to claim 15, wherein the alumina compound is sodium aluminate.

28. A process for preparing the coated titanium dioxide pigment according to claim 15, wherein the phosphate compound is sodium hexametaphosphate.

29. A process for preparing the coated titanium dioxide pigment according to claim 15, wherein the coated pigment is subjected to micronizing.

30. A process for preparing the coated titanium dioxide pigment according to claim 29, wherein the coated pigment is micronized with trimethylolpropane.

31. A process for preparing the coated titanium dioxide pigment according to claim 15, wherein the coated titanium dioxide pigment is produced by a continuous or batch process and combinations thereof.

32. A process for preparing coated titanium dioxide pigment comprising the steps of:
   a) preparing an aqueous slurry of titanium dioxide base,
   b) adding a first phosphate compound to the slurry to form a first phosphate deposit,
   c) increasing the pH of the slurry to about 7.0,
   d) heating the slurry to a temperature of about 80° C. to about 95° C.,
   e) adding a silica compound to the slurry over a period of about 30 minutes,
   f) aging the slurry for about 20 minutes,
   g) adjusting the pH of the slurry to about 6.5 over a period of about 60 minutes,
   h) adding a second phosphate compound to the slurry
   i) adding an alumina compound to the slurry under conditions such that the pH of the slurry is maintained at about 6.5,
   j) aging the slurry for about 30 minutes,
   k) adjusting the pH of the slurry to about 5.3 and,
   l) discharging and filtering the coated titanium dioxide pigment.

33. A coated titanium dioxide pigment according to claim 1 produced by the steps of:
   a) preparing an aqueous slurry of base titanium dioxide base,
   b) adding a first phosphate compound to the slurry to form a first phosphate coating,
   c) adding a silica compound to the slurry to form a silica compound coating,
   d) adding a second phosphate compound to the slurry
   e) adding an alumina compound coating to the slurry to form an alumina compound coating, thereby forming the coated titanium dioxide pigment.

34. A coated titanium dioxide pigment, comprising: a base titanium dioxide particle; a first deposit of a phosphate compound contiguous with the base titanium dioxide particle; a deposit of a silica or zirconia compound or combination thereof contiguous with the phosphate deposit; a second deposit of a phosphate compound contiguous with the silica or zirconia compound or combination thereof; and a deposit of an alumina compound contiguous with the second phosphate deposit.

35. A coated titanium dioxide pigment according to claim 34, wherein the zirconia compound is zirconium oxychloride or zirconyl sulfate.

36. A process for preparing coated titanium dioxide pigment, comprising the steps of:
   a) preparing an aqueous slurry of titanium dioxide base,
   b) adding a first phosphate compound to the slurry to form a first phosphate compound coating,
   c) adding a silica or zirconia compound or combination thereof to the slurry to form a coating comprising silica or zirconia or combination thereof,
   d) adding a second phosphate compound to the slurry,
   e) adding an alumina compound to the slurry to form an alumina compound coating, thereby forming the coated titanium dioxide pigment.

37. A process according to claim 36, wherein the zirconia compound is zirconium oxychloride or zirconyl sulfate.

* * * * *